United States Patent [19]
Heider et al.

[11] Patent Number: 4,518,193
[45] Date of Patent: May 21, 1985

[54] TOP CLOSURE FOR A RECTANGULAR BOX AND METHOD FOR USING SAME

[76] Inventors: Merle J. Heider, 203-12th St., S.W.; Dale J. Heider, 1108-8th Ave. S.W.; Leon J. Heider, R.R., all of Humboldt, Iowa 50548

[21] Appl. No.: 630,286

[22] Filed: Jul. 12, 1984

[51] Int. Cl.³ .............................................. B60J 11/00
[52] U.S. Cl. ..................................... 296/98; 296/100; 160/243; 220/211; 220/350
[58] Field of Search ................... 220/210, 211, 350; 150/52 K; 296/100, 98, 101; 160/243, 309, 310; 135/89, 115

[56] References Cited

U.S. PATENT DOCUMENTS

| | | | |
|---|---|---|---|
| 3,819,082 | 6/1974 | Rosenvold | 296/100 |
| 3,829,154 | 8/1974 | Becknell | 296/98 |
| 4,067,603 | 1/1978 | Fenton | 296/100 |
| 4,484,777 | 11/1984 | Michel | 296/98 |

*Primary Examiner*—George T. Hall
*Attorney, Agent, or Firm*—Zarley, McKee, Thompte, Voorhees & Sease

[57] ABSTRACT

The top closure of the present invention comprises a flexible sheet member sized to fit in covering relation over a top opening of a box. One edge of the sheet member is attached to the upper edge of one of the box walls. A pair of tracks are each positioned at the opposite ends of the box and an elongated shaft extends between the two tracks. The tracks guide the shaft from an open position adjacent one edge of the box to a closed position adjacent the other upper edge of the box. The flexible sheet member is rolled around the shaft when the shaft is in its open position, and the sheet member unrolls from the shaft as the shaft rolls towards its closed position. When the shaft reaches its closed position, it engages a plurality of flaps which are mounted along the edge of the box. These flaps wrap around the shaft as the shaft rotates, and become attached to the shaft, thereby fastening the shaft to the sidewalls of the box with the tarpaulin in covering relationship over the opening. Reversal of the rotational direction of the shaft causes the flaps to unroll and detach from the shaft so that the shaft can roll back towards its open position, and thereby uncover the opening in the box. The shaft may be rotated either by an electrical motor or by a manual crank.

8 Claims, 14 Drawing Figures

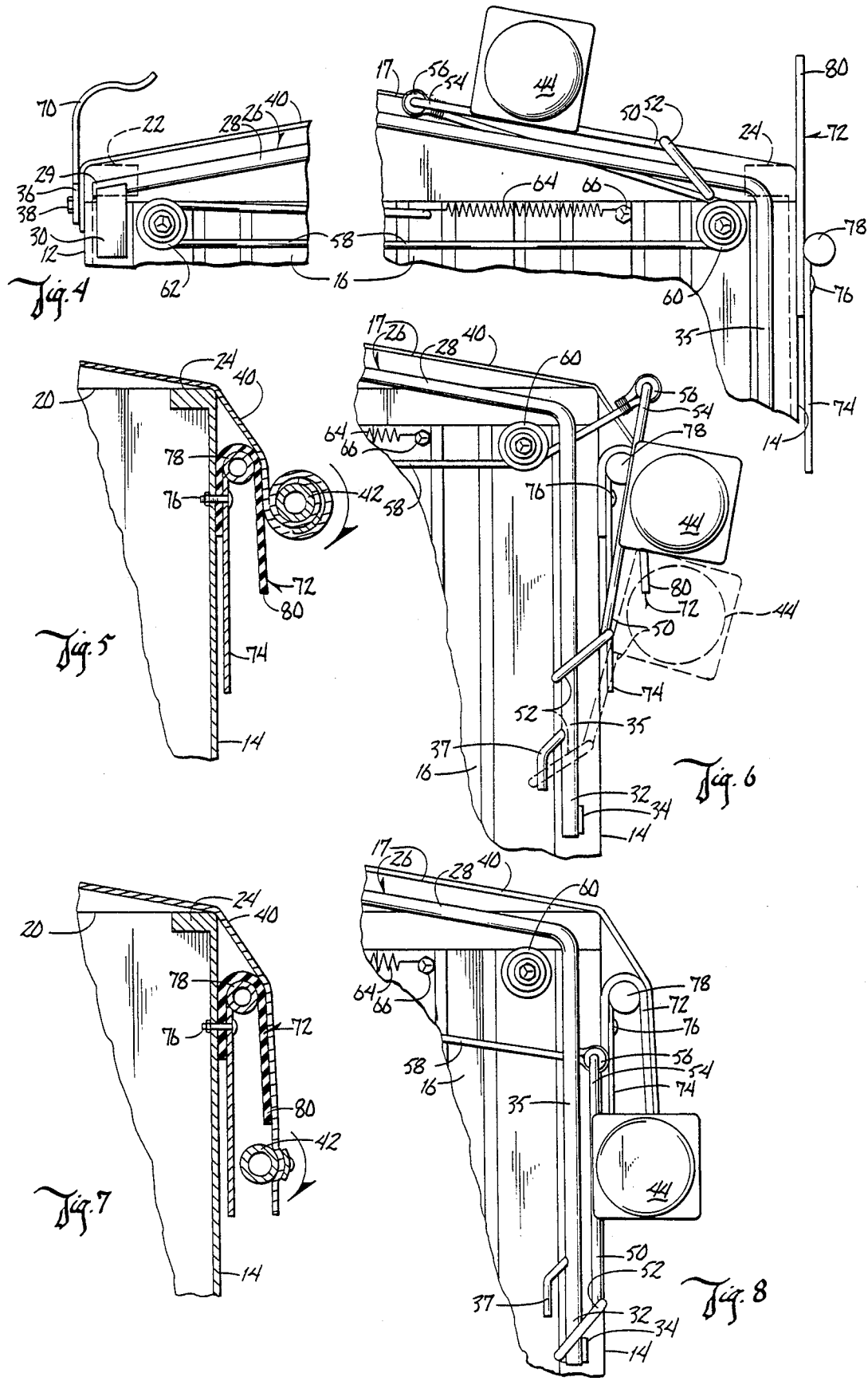

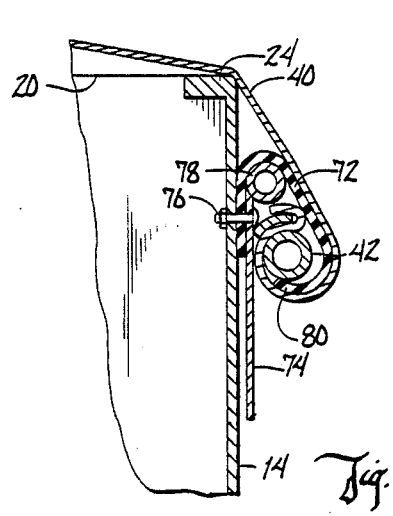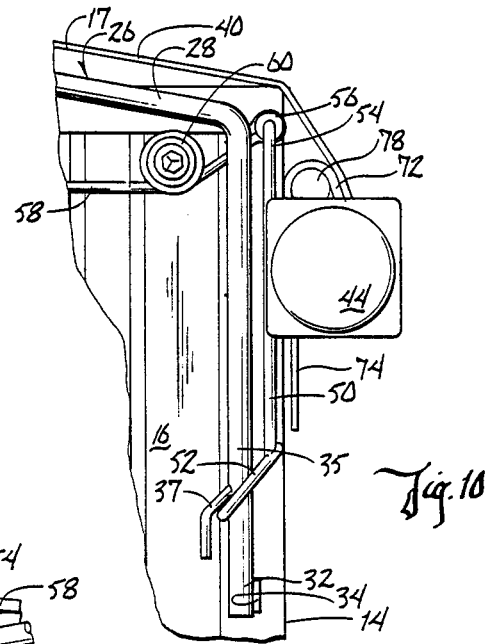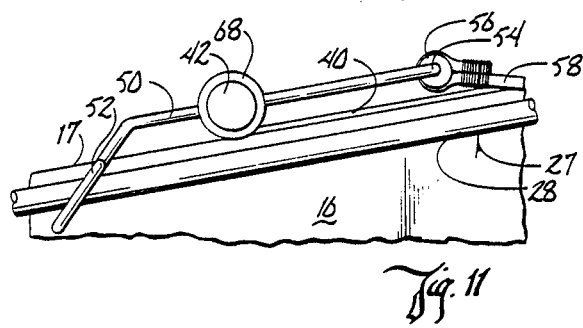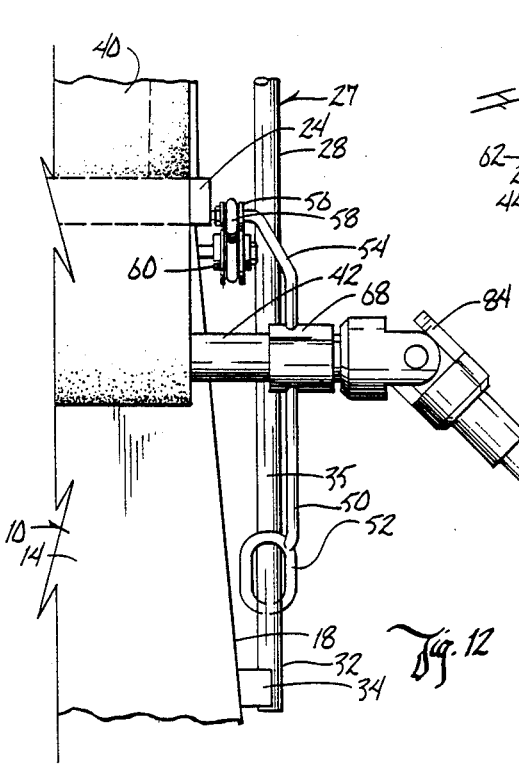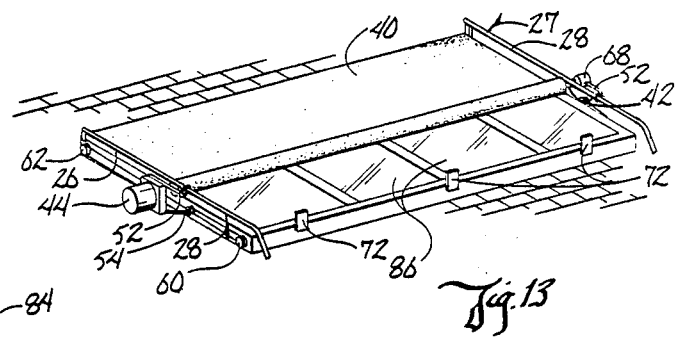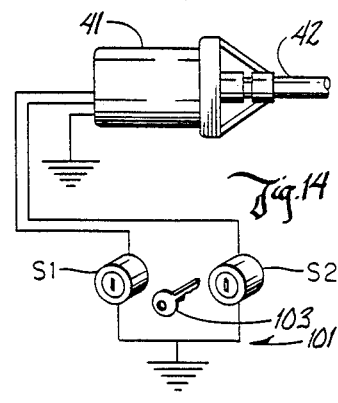

TOP CLOSURE FOR A RECTANGULAR BOX AND METHOD FOR USING SAME

BACKGROUND OF THE INVENTION

This invention relates to a top closure for a rectangular box. Various attempts have been made to provide a top closure for an elongated box having an open upper end. Tarpaulins or other flexible sheet members can be rolled across the open upper end of the box to provide a cover. Such a cover has application for covering the tops of truck trailers, for covering the upper ends of bins, or for covering such things as solar collectors.

One problem encountered with flexible covers used outdoors is the exposure of the flexible cover to wind. Means must be provided for holding the flexible cover against movement or billowing in the wind. Furthermore, it is desirable to provide a flexible cover which can be quickly and easily moved from its open to its closed position with a minimum of effort and time.

Means have been provided for rolling a tarpaulin on an elongated shaft so that by rolling the shaft it is possible to roll and unroll and tarpaulin from an open to a closed covering relationship over the open upper end of the box. However, with such devices, it is difficult to keep proper tension on the tarpaulin during rolling and unrolling. Furthermore, during the unrolling operation, it is necessary to face the truck trailer in such a manner that the wind will not catch the tarpaulin. Otherwise, the wind will go beneath the tarpaulin, catch it and perhaps rip or tear it.

Therefore, a primary object of the present invention is the provision of an improved top closure for a rectangular box.

A further object of the present invention is the provision of an improved top closure which is held positively so as to minimize damage to the cover during exposure to the wind.

A further object of the present invention is the provision of a top closure which maintains a constant tension on the flexible cover so as to hold it in tight covering relationship over the open end of the box.

A further object of the present invention is the provision of a top closure having fastening means for fastening the closure in closed relationship over the open upper end of the box.

A further object of the present invention is the provision of fastening means which automatically attach the tarpaulin to the box in response to unrolling of the tarpaulin to its closed position.

A further object of the present invention is the provision of a top closure wherein a substantially constant tension is applied to the flexible sheet member throughout its movement from its closed to its open position.

A further object of the present invention is the provision of a top closure having a power device for automatically unrolling the flexible sheet member.

A further object of the present invention is the provision of a device which is economical to manufacture, durable in use and efficient in operation.

The present invention utilizes a flexible sheet member which is anchored adjacent one edge of the box opening. The sheet member is wound around an elongated shaft and the shaft is guided at its opposite ends by tracks which span the width of the box opening. The shaft is adapted to roll from a first position adjacent the anchored end of the sheet member to a second position adjacent the opposite edge of the box opening, so as to spread the sheet member in covering relationship over the opening. As the shaft moves from its first to its second position, it unrolls the sheet member and causes the sheet member to cover the opening.

A plurality of flexible flaps are connected along the upper edge of the box opposite from the edge to which the sheet member is anchored. These flexible flaps protrude upwardly above the upper edge of the box sidewall.

As the shaft unrolls the tarpaulin towards its closed position, the shaft and tarpaulin engage these flexible flaps and cause the flaps to wrap around and become attached to the shaft. Because the flaps are also attached to the side wall of the box, they cause the shaft and the tarpaulin to be attached to the box when they become wrapped around the shaft. Thus, as the shaft rotates and moves towards its closed position, it engages the flaps and becomes attached to the sidewall of the box.

In order to maintain tension on the sheet member, a spring is attached to the shaft and maintains a constant tension on the sheet member throughout the rolling movement of the shaft from its open to its closed position. The spring is attached to a connecting member extending from the spring to the shaft and the connecting member is attached to the shaft so that the spring will maintain a constant tension on the tarpaulin throughout movement from its open to its closed position.

The shaft may be rotated either by an electric motor or by a hand crank. The electric motor used for the present invention has a track follower which engages the track at a point spaced from the shaft around which the sheet member is wound. Actuation of the motor causes rotation of the shaft so as to cause it to move from its open to its closed position. Because the track follower is spaced from the rotational axis of the shaft, the track follower provides a stabilizing function to the motor to prevent rotation of the motor. The spring also provides further aid in causing the shaft to move to its closed position.

In order to open the closure, the motor is actuated so as to rotate in the opposite direction (or in the case of a hand crank, the crank is rotated in the opposite direction), thereby causing the shaft to unwind the flaps and thereby detach the shaft from the sidewall of the box. Continued rotation of the shaft causes the shaft to wind the tarpaulin upon the shaft and to pull the shaft towards its open position. The winding up of the sheet member causes the shaft to be pulled from its closed position to its open position against the bias of the spring.

The flaps for securing the shaft in its closed position may comprise a single elongated flap which runs along the entire upper edge of the box opening or it may be a plurality of smaller flaps spaced apart from one another and extending along the upper edge of the box adjacent the box opening. These flaps secure the shaft to the sidewalls of the box in such a manner that the wind cannot get underneath the tarpaulin and cause ripping or tearing of the tarpaulin.

BRIEF DESCRIPTION OF THE FIGURES OF THE DRAWING

FIG. 4 is an end elevational view as taken along line 4—4 of FIG. 2.

FIG. 5 is a partial detailed sectional view taken along line 9—9 of FIG. 3, but showing the initial position of the flexible flap during the unrolling of the tarpaulin to its closed position.

FIG. 6 is an end view taken along line 10—10 of FIG. 3, but showing the components in the same position as FIG. 5.

FIG. 7 is a sectional view taken along line 9—9 of FIG. 3, but showing a second stage in the attachment of the flap to the rolling shaft.

FIG. 8 is an end view taken along line 10—10 of FIG. 3, but showing the components in the same position as shown in FIG. 7.

FIG. 9 is a sectional view taken along line 9—9 of FIG. 3.

FIG. 10 is an end view taken along line 10—10 of FIG. 3.

FIG. 11 is a partial and elevational view as taken along line 11—11 of FIG. 3.

FIG. 12 is a partial side elevational view of a modified form of the invention utilizing a crank instead of an electric motor to rotate the shaft.

FIG. 13 is a perspective view of a modified form of the invention for use with a solar collector.

FIG. 14 is a schematic diagram of the switching system for opening and closing the tarpaulin.

DETAILED DESCRIPTION OF THE PREFERRED EMBODIMENT

Figure 1:
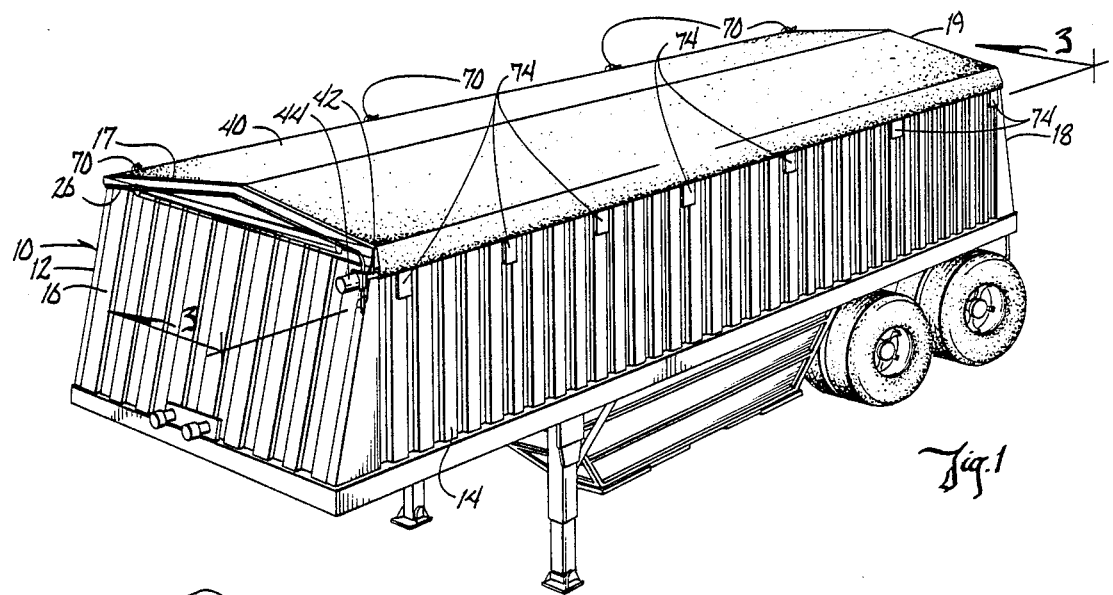
FIG. 1 is a perspective view of a truck trailer having the closure means of the present invention thereon.
Figure 2:
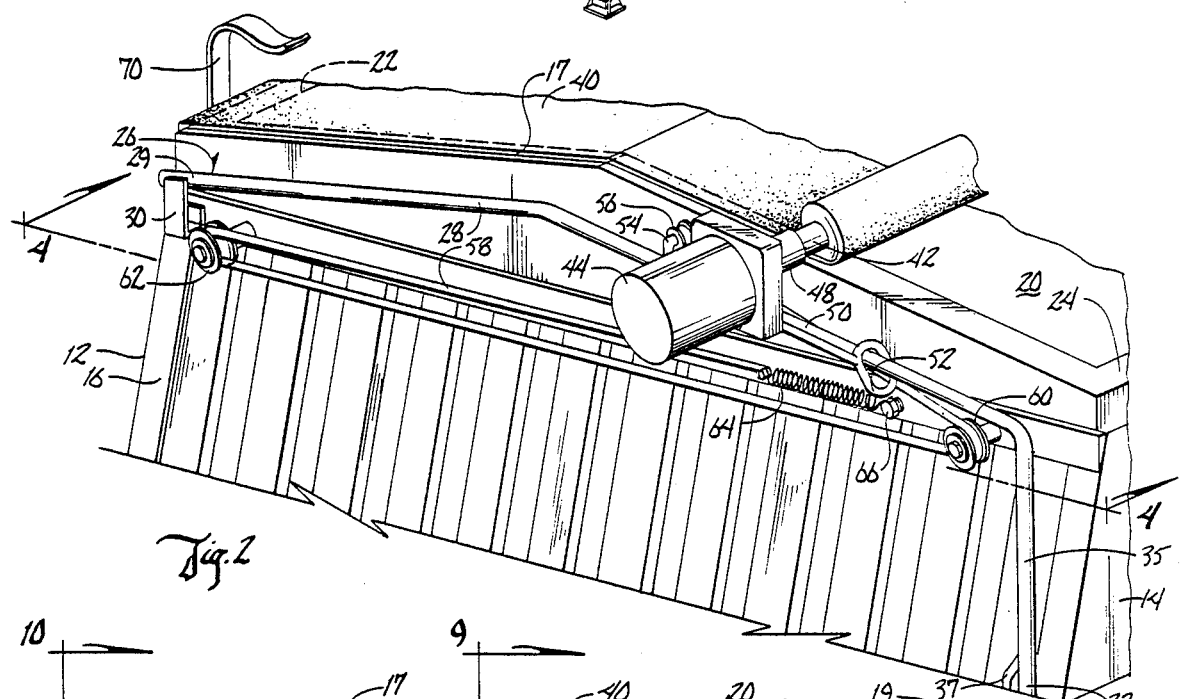
FIG. 2 is an enlarged perspective view of the left end of the trailer body shown in FIG. 1.

Referring to the drawings, the numeral 10 generally designates a truck trailer body having opposite side walls 12, 14 and opposite end walls 16, 18. The upper edges of walls 12, 14, 16, 18 define a rectangular opening designated by the numeral 20. Opening 20 has a first edge 22 and a second opposite edge 24 which define the lateral edges of opening 20.

Spanning the distance between edges 22, 24 of opening 20 at the opposite ends thereof are a pair of track assemblies 26, 27. Track assemblies 26 and 27 are identical in construction and each include an elongated track rod 28 having a first end 29 attached to truck body 10 adjacent first edge 22 by means of a track bracket 30. Track rod 28 extends across the width of the truck trailer body 10 to a point adjacent second edge 24 of opening 20. Rod 28 then extends vertically downwardly from edge 24 to a lower end 32 which is attached to side wall 14 by means of a bracket 34. The vertical end portion of rod 32 is referred to generally by the numeral 35. Adjacent the lower end 32 of rod 28 is a retaining finger 37.

An elongated anchor strip 36 (FIG. 4) is attached by means of bolts 38 to the first edge 22 of opening 20. Anchor strip 36 is also operatively attached to a flexible sheet member or tarpaulin 40 so as to anchor sheet member 40 to the first edge 22 of opening 20. Sheet member 40 is sized to fit in covering relationship over rectangular opening 20.

Figure 3:
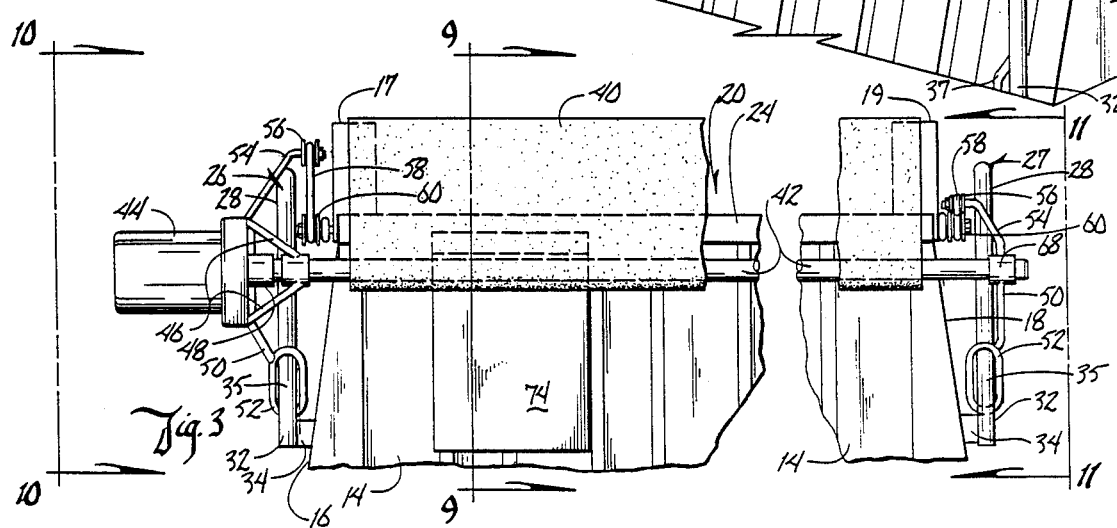
FIG. 3 is an enlarged side elevational view as taken along line 3—3 of FIG. 1.

Sheet member 40 is wound around an elongated shaft 42 which has its opposite ends spanning the distance between track assemblies 26 and 27, as shown in FIG. 3.

End walls 16, 18 each include an upper edge 17, 19 respectively. Shaft 42 spans and rests upon the upper edges 17 and 19. A motor 44 is operatively connected to one end of shaft 42 for causing rotation of the same.

Connected to the motor 44 are a plurality of support struts 46 which extend to a sleeve bearing 48, which surrounds shaft 42. Also connected to motor 44 is a wire guide 50 which extends laterally away from the rotational axis of shaft 42 and which has a guide loop 52 surrounding track rod 28, so as to permit motor 44 and rod 42 to slide along the length of track rod 28.

Also connected to motor 44 is a spring tensioning rod 54 having a belt coupler 56 on the end thereof. Coupled to belt coupler 56 is an elongated tensioning belt 58 which extends around a first pulley 60 and then around a second pulley 62, and then is connected to a tensioning spring 64. Tensioning spring 64 is connected to an anchor 66 on end wall 16. Tensioning spring 64 and tensioning belt 58 provide a yieldable spring tension on motor 44 urging motor 44 toward the edge 24 of opening 20.

The opposite end of shaft 42 is provided with a sleeve bearing 68 to which is connected a spring tensioning rod 54 identical to the spring tensioning rod 54 at the opposite end of rod 42. A wire guide 50, having a guide loop 52 is also connected to sleeve 68 and loop 52 is slidably mounted over track assembly 27.

The above arrangement at the opposite ends of shaft 42 permits shaft 42 to rotate and permits motor 44 to rotate shaft 42. At the same time, it permits shaft 42 and motor 44 to move along the entire length of track assemblies 26, 27.

Tarpaulin 40 is wrapped around shaft 42. Shaft 42 may be rotated until the entire tarpaulin 40 is wrapped around shaft 42 and shaft 42 is adjacent edge 22 of opening 20. A plurality of nesting brackets 77 are attached to side wall 12 adjacent edge 22 and are adapted to receive the roll created by rolling tarpaulin 40 around shaft 42. In this position the opening 20 is completely exposed from above.

Also in this position, the tensioning belt 58 is yieldably urging shaft 42 towards edge 24 of opening 20, but this spring tension is resisted by virtue of the fact that shaft 42 is held against rotation by motor 44.

When it is desired to move the tarpaulin into covering relation over opening 20, motor 44 is actuated so as to cause rotation of shaft 42 and thereby unroll tarpaulin 40 from shaft 42. As the tarpaulin 40 unrolls, the spring tensioning from belt 58 and spring 64 causes the shaft to move toward edge 24 of opening 20.

As can be seen in FIGS. 1 and 4, a plurality of flexible flaps 72 are mounted in spaced relation to one another along the upper edge of side wall 14. These flaps are held in attachment to side wall 14 by means of a flat plate 74, through which extends a bolt 76. The lower edge of each flexible flap 72 is held against wall 14 by means of bolt 76 and plate 74. The upper edge of plate 74 includes a fulcrum rod 78, which is welded along the upper edge thereof.

Flap 72 is preferably made of a flexible resilient material such as rubber or of plastic or stiff fabric. The upper end 80 of flap 72 protrudes upwardly above edge 24 of opening 20, and its characteristics should be such that the flap will normally be self-supporting in an upstanding position such as shown in FIG. 4. However, the flap 72 should be yieldable to the downwardly folded position of FIG. 5, and should be capable of wrapping around shaft 42.

FIGS. 5 and 6 show the initial reaction of flap 72 when it is encountered by shaft 42 as shaft 42 unrolls the tarpaulin 40. The engagement of shaft 42 with the upper end 80 of flap 72, causes flap 72 to bend from the position shown in FIG. 4 to the position shown in FIG. 5.

FIG. 7 shows rod 42 in a position wherein the entire tarpaulin 40 is unrolled. In this position, rod 42 is below edge 80 of flap 72. It should be noted that fulcruming rod 78 provides a fulcrum or bending point for flap 80.

Further rotation of shaft 42 causes the flap 72 to be rolled up around shaft 42 as shown in FIGS. 9 and 10. Motor 40 will cause the flap to be rolled up around shaft 42 until all the slack is taken out of flap 72 and the shaft 42 can be rolled no further. This will secure shaft 42 tightly to side wall 12 as shown in FIGS. 9 and 10.

As can be seen in FIG. 1, the placement of a plurality of flaps 72 along the length of the upper edge of wall 14 causes the shaft 42 to be tightly attached to wall 14 along its entire length. This prevents bending of shaft 42 and also prevents the wind from getting underneath the tarpaulin to cause ripping of the tarpaulin or bending of shaft 42.

As can be seen from a comparison of FIGS. 6, 8 and 10, an additional securing means is provided for holding motor 44 against movement when the tarpaulin or shaft are in their covered position. The loop 52 progresses downwardly, sliding down the vertical portion 35 of track rod 28. Loop 52 slides over finger 37 as shown in FIG. 6, and progresses downwardly to its lowermost position as shown in FIG. 8. Continued rotation of shaft 42 causes loop 52 to move upwardly to the position shown in FIG. 10. In this position, loop 52 has moved under finger 67 and is held tightly in position by finger 37.

When it is desired to open the tarpaulin, motor 44 is actuated to reverse the direction of rotation of shaft 42. This causes flap 72 to be unrolled from the position shown in FIG. 9 to the position shown in FIG. 7. Similarly, the loop 52 moves from the position shown in FIG. 10 to the position shown in FIG. 9. Continued rotation of shaft 42 in this direction (counterclockwise as viewed in FIGS. 5-10), causes the shaft to return to the position of FIGS. 5 and 6. Also, the rotation of the shaft causes the motor 44 to tilt outwardly to the position shown in shadow lines in FIG. 6, thereby causing loop 52 to tilt out around finger 37.

Continued rotation of shaft 42 in a counterclockwise direction (as viewed in FIGS. 6-10), causes the tarpaulin 40 to be rolled up again on shaft 42, and this rolling action causes shaft 42 to move towards edge 22 of opening 20, thereby exposing opening 20. The spring tensioning of spring 64 and spring tensioning belt 58 yields to this movement.

Referring to FIG. 12, a modified form of the invention is shown utilizing a crank arm 82 in the place of motor 44. Crank arm 82 is connected by means of a universal coupling 84 to shaft 42. All other parts remain the same and therefore corresponding numerals are used in FIG. 12.

Referring to FIG. 13, a modified form of the invention is shown for application in combination with a solar collector designated by the numeral 86. The corresponding parts remain the same, with the solar collector 86 corresponding to the opening 20.

Referring to FIG. 14, a schematic diagram is shown for a switching system to be used with motor 44. Motor 44 is a reversible electric motor. It is connected to an electrical power source 101 by means of an open switch S1. Also connecting motor 40 to electrical power source 101 is a close switch S2. Switches S1 and S2 are preferably key operated switches located in the truck cab which may be operated by a single key 103.

When it is desired to open the tarpaulin, the key 103 is inserted into S1 and turned so as to actuate motor 44 in a first rotational direction which causes the tarpaulin to be rolled up. When it is desired to close the tarpaulin, key 103 is removed from S1 and inserted into S2. Turning key 103 in switch S2 causes the motor 44 to rotate in the opposite direction so that the tarpaulin will be unwound and placed in covering relation over the trailer.

The use of two switches S1 and S2 with a single key 103 prevents accidental opening of the tarpaulin while the truck is moving. Such an error could result in the wind catching the tarpaulin and damaging it. However, if the key is kept in the switch S2, then the motor cannot be accidentally actuated to open the tarpaulin. Furthermore, the driver can turn the key in switch S2 while driving in order to tighten down the tarpaulin if needed.

The present invention permits the tarpaulin to be moved from its closed to its open position automatically. Furthermore, attachment of the tarpaulin in its closed position is automatic, and tight securement is obtained along the entire length of shaft 42.

Thus, it can be seen that the device accomplishes at least all of its stated objectives.

What is claimed is:

1. A top closure for a rectangular box having a pair of opposite end walls and a pair of opposite side walls, said box having a top opening adjacent the upper edges of said end and side walls, said top closure comprising:

a flexible sheet member having first and second opposite edges and being sized to fit in covering relation over said top opening;

anchor means attaching said first edge of said sheet member to one of said side walls adjacent said upper edge thereof;

each of said upper edges of said end walls being provided with track means, each of said track means being elongated and extending from one said box side wall to the other of said box side walls;

an elongated shaft having opposite ends retentively engaged by said track means for movement from an open position wherein said shaft is adjacent said one box sidewall to a closed position wherein said shaft is adjacent said other box sidewall;

spring means interconnecting said box and said shaft for yieldably urging said shaft to said closed position;

said shaft being attached to said second edge of said sheet member with said sheet member being wound around said shaft when said shaft is in said open position, said shaft being capable of turning and unwinding said sheet member while moving from said open to said closed position;

power means connected to said shaft for rotating said shaft to wind and unwind said sheet member;

securing means connected adjacent said upper edge of said other side wall for retentively engaging said shaft when shaft is in said closed position;

said securing means comprising at least one flexible flap having a first end and a second end, said first end being attached to said other sidewall so as to hold said second end in a position which is in the path of said rotating shaft as said shaft moves from said open to said closed position, whereby said second end of said flap will wind around and become attached to said shaft during continued movement of said rotating shaft to said closed position.

2. A top closure according to claim 1 wherein said flexible flap has a normal position wherein said second end extends upwardly from said first end and protrudes upwardly above said upper edge of said other sidewall, said flap being made of resilient material which will yield and bend when engaged by said shaft so that said rotating shaft will cause said flap to wind around said shaft and become attached thereto.

3. A top closure according to claim 1 wherein said power means comprises an electric motor drivingly connected to said shaft for rotating said shaft.

4. A top closure according to claim 1 wherein said power means comprises a crank handle operatively connected to said shaft for permitting manual rotation of said shaft.

5. A method for operating a top closure for a top opening of a rectangular box having a pair of opposite end walls and a pair of opposite side walls, said top opening being formed by the upper edges of said end and said walls; said method comprising:
 attaching one edge of a flexible sheet member sized to cover said top opening to an elongated shaft,
 winding said sheet member into a roll around said shaft,
 attaching the free edge of said roller sheet member to one of said side walls of said box with said shaft and said roll parallel to and adjacent said top edge of said one side wall and with the opposite ends of said shaft protruding beyond said top edges of said end walls;
 rotating said shaft to unroll said rolled sheet member while at the same time moving said shaft towards the other of said side walls;
 engaging said rotating shaft with at least one flexible flap adjacent said top edge of said other side wall, said flap having one end attached to said other side wall and having a free end;
 continuing to rotate said shaft whereby said free end of said flap will wind around and become attached to said shaft so as to secure said shaft to said other side wall.

6. A method according to claim 5 comprising reversing the direction of rotation of said shaft whereby said flap will unwind from said shaft and said flexible sheet member will be rolled up on said shaft.

7. A top closure for a rectangular box having a pair of opposite end walls and a pair of opposite side walls, said box having a top opening adjacent the upper edges of said end and side walls, said top closure comprising:
 a flexible sheet member having first and second opposite edges and being sized to fit in covering relation over said top opening;
 anchor means attaching said first edge of said sheet member to one of said side walls adjacent said upper edge thereof;
 each of said upper edges of said end walls being provided with track means, each of said track means being elongated and extending from one said box side wall to the other of said box side walls;
 an elongated shaft having opposite ends retentively engaged by said track means for movement from an open position wherein said shaft is adjacent said one box sidewall to a closed position wherein said shaft is adjacent said other box sidewall;
 spring means interconnecting said box and said shaft for yieldably urging said shaft to said closed position;
 said shaft being attached to said second edge of said sheet member with said sheet member being wound around said shaft when said shaft is in said open position, said shaft being capable of turning and unwinding said sheet member while moving from said open to said closed position;
 power means connected to said shaft for rotating said shaft to wind and unwind said sheet member;
 securing means connected adjacent said upper edge of said other side wall for retentively engaging said shaft when shaft is in said closed position;
 reversible power means connected to said shaft for rotating said shaft to wind and unwind said sheet member;
 switch means connected to said power means, said switch means comprising a first switch adapted to be moved to an on position for actuating said power means to rotate said shaft in a first direction and a second switch adapted to be moved to an on position for actuating said power means to rotate said shaft in a second direction opposite from said first direction.

8. A top closure according to claim 1 wherein said first and second switches are key actuatable switches and a single key is adapted to actuate both of said switches one at a time.

* * * * *